July 30, 1968
H. L. OLIVER
3,394,626
MACHINE SCREW THREADS
Filed March 17, 1967
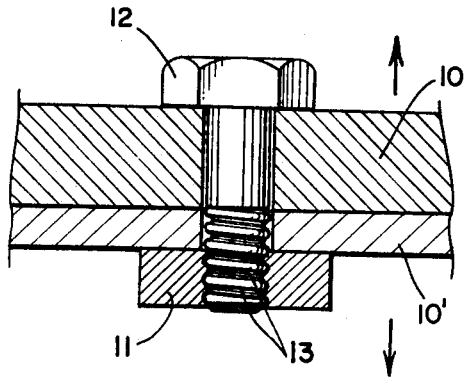
FIG. 1
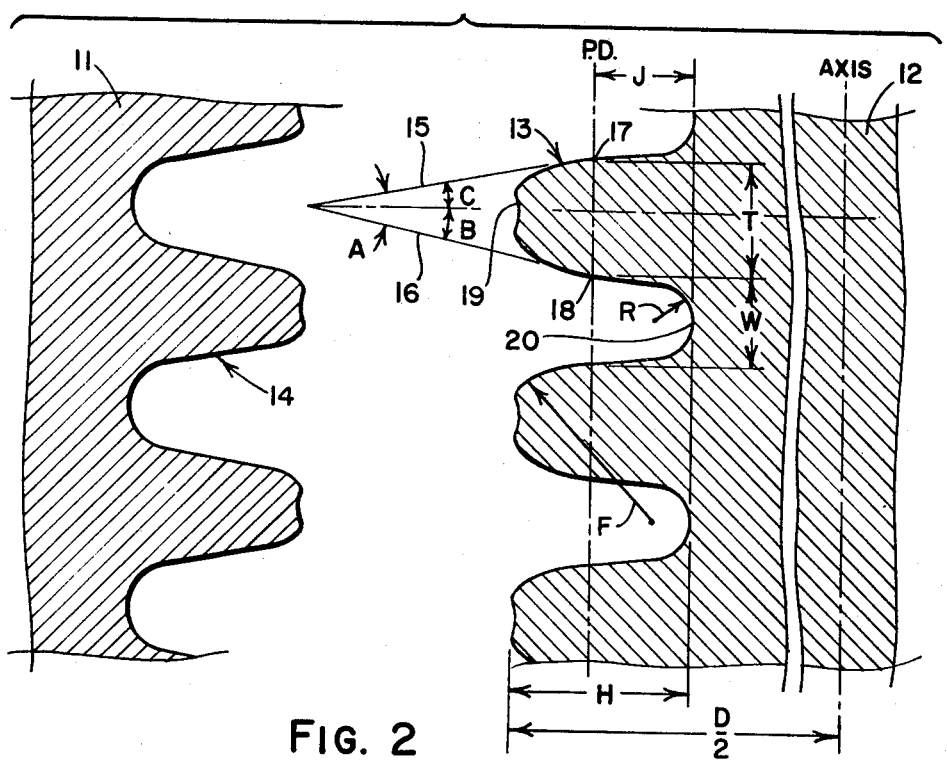
FIG. 2
| A ≤ 28° | T > W |
| --- | --- |
| 5° ≤ B ≤ 14° | .45W ≤ R ≤ .60W |
| C ≤ 14° | H < .10D |
FIG. 3
INVENTOR
HAROLD L. OLIVER
BY *Elliott & Pastoriza*
ATTORNEYS

United States Patent Office 3,394,626
Patented July 30, 1968

3,394,626
MACHINE SCREW THREADS
Harold L. Oliver, 3845 Ver Halen Court,
Culver City, Calif. 90230
Filed Mar. 17, 1967, Ser. No. 624,010
4 Claims. (Cl. 85—1)

ABSTRACT OF THE DISCLOSURE

An improved thread design for machine screws in which the upper and lower thread surfaces or flanks are close to perpendicular to the thread axis at the points intersected by a pitch line running parallel to the axis of the screw intermediate the tip and root of the thread. This structure is in contradistinction to conventional threads of equilateral triangular cross section forming 60° angles. Further, the thickness of the thread measured along the pitch line is greater than the thickness of the root measured along the pitch line. This arrangement permits radiusing of the root thereby avoiding the notch effect characteristic of the equilateral triangular or 60° angle thread. In addition, loading of the screw threads is in a direction almost parallel to the screw axis with the result that the threads carry the load in shear thereby increasing the screw strength and reducing the number of threads necessary for a given strength fastening.

---

This invention relates to an improved thread structure for machine screws.

Conventional machine screws, with the exception of the Acme thread, usually have thread structures with cross sections corresponding substantially to an equilateral triangle resulting in a 60° angle at the root and a 60° angle at the tip. The 60° angle at the root results in a notch which is often detrimental to the fatigue strength of the screw. Heretofore, a radiusing of the notch has been attempted to remove this "notch effect." However, the triangular thread construction results, even with such radiusing, in a width which is less at the pitch diameter or pitch line defining the load carrying portion of the thread than at the root. Thus there is not the high strength that would result with an increased width of the thread at the pitch line, and to this extent the thread is weak.

In addition, the face or flank of the thread carrying the load is at a 60° angle to the screw axis. As a consequence, the load is carried at a divergent angle to the screw axis, a component of the load force being directed radially inwardly towards the screw axis. A corresponding component of the load force is directed outwardly against the mating thread of the nut or internally threaded member receiving the screw and thus these force components are esentially wasted insofar as carrying a load directed along the axis of the screw is concerned.

With the foregoing in mind, it is a primary object of the present invention to provide an improved machine screw thread construction wherein the foregoing problems are overcome.

More particularly, it is an object to provide a thread design wherein a larger radius at the root of the thread can be realized than characterizes prior art threads thereby decreasing the "notch effect."

Another object is to provide a screw thread construction in which the width of the thread along the pitch line is nearly the same as at the root to the end that the load carrying portion of the thread is of greater strength.

Still another object is to provide an improved machine screw thread construction wherein the load carrying surfaces of the screw thread are loaded in a direction almost parallel to the screw axis so that the thread carries the load in shear and radially directed inward and outward components of the load force are minimized.

Another object is to provide an improved machine screw thread construction which is capable of providing a given fastening strength with fewer threads than required on prior art screws providing the same fastening strength.

A further object is to provide an improved machine screw thread having a greater fatigue resistance than characterizes prior art threads.

Briefly, these and many other objects and advantages of this invention are attained by providing a machine screw thread having a width measured along a pitch line parallel to the screw axis and passing intermediate the root and tip of the thread greater than the width of the root measured along the pitch line. In addition, the upper and lower surfaces or flanks of the thread when viewed in cross section are such that a tangent to the upper flank at its point of intersection with the pitch line forms an acute angle less than 28° with the tangent to the lower flank of the thread at its point of intersection with the pitch line. This design results in the load carrying surface of the thread being nearly perpendicular to the screw axis so that the threads will carry the load in shear. In addition, the design enables a greater radiusing of the root portions of the threads such that the "notch effect" is considerably decreased.

A better understanding of the invention will be had by referring to a preferred embodiment thereof as illustrated in the accompanying drawings, in which:

FIGURE 1 is a cross-sectional view of two members secured together by a machine screw having threads designed in accordance with the present invention, the machine screw being shown in full lines;

FIGURE 2 is a greatly enlarged fragmentary exploded view of a portion of the machine screw threads of FIGURE 1 and the threaded receiving nut or member within which the machine screw is received; and, FIGURE 3 is a table setting forth certain restrictions on various dimensions given in FIGURE 2.

Referring first to FIGURE 1, there are shown first and second members 10 and 10' secured together by a nut 11 and machine screw 12. In accord with the present invention, the machine screw 12 is provided with a novel thread of uniform pitch as indicated at 13 for mating with a novel complementary thread 14 formed in the nut 11.

Referring now to FIGURE 2, details of the threads will be evident. As shown, the pitch diameter is defined by a vertical dashed line P.D. running parallel to the axis of the screw 12, this axis being shown to the right. The pitch line P.D. falls intermediate the root and tip of the thread. For example, if the distance between the tip and root is H as shown the pitch line P.D. may be disposed a distance J of the order of .6H.

As shown in FIGURE 2 there are drawn two lines 15 and 16 tangent to the upper flank surface and lower flank surface of the thread at the points 17 and 18 corresponding to the points of intersection of the pitch line. The angle A between the tangents 15 and 16 is less than 28°. The width or axial thickness of the thread as measured along the pitch line P.D. is designated T and is made greater than the axial distance between the flanks of adjacent convolutions of the thread; that is, the width of the root as measured along the pitch line indicated at W. Further, the angle C of the tangent 15 with a line perpendicular to the screw axis is less than 14°. The angle B of the tangent line 16 measured with respect to the line perpendicular to the screw axis lies between 5° and 14°.

It will be evident from the foregoing restrictions on the thread structure that the upper and lower flank surfaces 17 and 18 are nearly perpendicular to the screw axis and thus will carry a load directed along the screw axis substantially in shear. In addition, with this construction it is possible to provide a fairly large radius for the root thus decreasing the "notch effect." This radius is indicated by the radius of curvature R which has a value between .45W and .60W.

The tip and root of the thread are respectively indicated at 19 and 20. Preferably, the initial portion of the tip 19 beyond the pitch line P.D. has a radius of curvature indicated at F. The extreme tip is free formed as shown.

The distance H between the tip and root points 19 and 20 is preferably less than .10D where D is the tip diameter of the threads. This results in a larger body cross section relative to the tip diameter of the threads to provide greater strength.

The internal threads in the nut 11 indicated at 14 in FIGURE 2 are complementary to the threads 13 of the screw. As a consequence, it will be evident that the width of the internal thread 14 will be less than the width of the notch portion measured along a corresponding pitch line intermediate the root and tips of the internal threads 14. However, the particular restriction for the screw threads wherein T is greater than W is not essential for the nut threads 14 since the surrounding mass of the nut from which the threads protrude is considerably greater than the shank mass of the screw and can thus carry a considerably greater load than the screw.

FIGURE 3 is a table in which the various dimensions and their relationships for the screw threads are summarized.

In the operation of the machine screw, it will be evident that with the screw threaded into the member 11 to effect a fastening, the loading of the screw will take place in a direction almost parallel to the screw axis or almost normal to the upper flank surfaces of the screw thread. As a consequence, there will be only insignificant force components directed radially inwardly or outwardly and to this extent the "hoop tension" applied to the nut 11 will be considerably less than that which would result were a 60° angle thread to be employed. Moreover, the threads of the screw will carry the load in shear.

In addition, and as also mentioned heretofore, the radiusing of the root 20 as indicated at R and the tip 19 decreases the "notch effect" both in respect to the screw threads and the internal threads 14.

From the foregoing description, it will be thus evident that the present invention has provided a greatly improved machine screw thread wherein all of the various objects set forth heretofore are fully realized.

What is claimed is:

1. A machine screw thread of uniform pitch having a pitch diameter line parallel to the screw axis and passing intermediate the root and tip of the thread, the axial thickness of the thread measured along said pitch line being greater than the axial distance between the flanks of adjacent convolutions of the thread, a tangent to the upper flank of said thread at its point of intersection with said pitch line forming an acute angle less than 14° with a line perpendicular to said pitch line, and a tangent to the lower flank of said thread at its point of intersection with said pitch line forming an acute angle between 5° and 14° with said line perpendicular to said pitch line.

2. A machine screw according to claim 1, in which said root has a radius between .45 and .60 of said width of the thread measured along said pitch line.

3. A machine screw according to claim 1, in which the distance between the tip and root of said thread is less than .10 of the thread tip diameter of said screw.

4. A machine screw according to claim 1, in which the initial tip portion of said thread outside said pitch line is radiused and the extreme tip is free formed.

References Cited
UNITED STATES PATENTS

| | | | |
|---|---|---|---|
| 2,449,313 | 9/1948 | Naef | 85—46 |
| 2,742,074 | 4/1956 | Rosan | 85—46 |
| 2,788,046 | 4/1957 | Rosan | 85—46 |
| 3,258,284 | 6/1966 | Phipps | 85—46 |
| 3,266,363 | 8/1966 | Bronson et al. | 151—22 |

CARL W. TOMLIN, *Primary Examiner.*

R. S. BRITTS, *Assistant Examiner.*